Oct. 22, 1957
C. B. FITES
2,810,393
AUTOMATIC DRAIN VALVE
Filed July 28, 1955
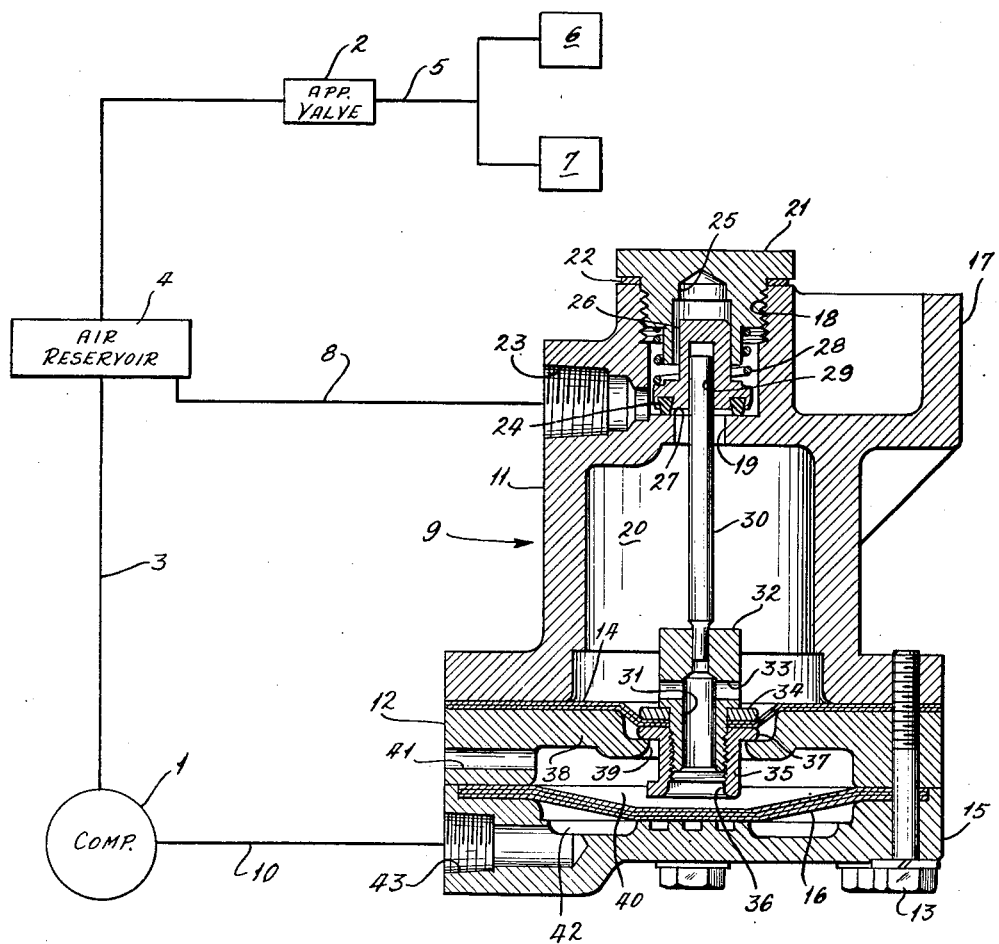
INVENTOR:
CYRIL B. FITES
By Gravely, Lieder, Woodruff & Wille
ATTORNEYS.

United States Patent Office 2,810,393
Patented Oct. 22, 1957

2,810,393

AUTOMATIC DRAIN VALVE

Cyril B. Fites, St. Johns, Mo., assignor to Wagner Electric Corporation, St. Louis County, Mo., a corporation of Missouri Application July 28, 1955, Serial No. 524,955

8 Claims. (Cl. 137—204)

This invention relates in general to drain valves and in particular to drain valves for automatically ejecting condensate from compressed air systems used on automotive vehicles.

As moisture laden ambient air is compressed by a compressor, the temperature thereof is greatly increased. Upon discharge from said compressor, the relatively hot moisture laden compressed air passes through a discharge conduit which is exposed to the relatively cooler ambient air. In this manner, the moisture in the hot compressed air forms a condensate which ultimately accumulates in the storage reservoir.

In the past, the accumulated condensation was manually drained from these tanks. However, this method was time-consuming and therefore quite expensive. More recently, automatic drain valves have been employed which are intermittently actuated while the vehicle is in operation. However, these intermittent ejections tend to bleed the reservoir of compressed air unnecessarily.

Automatic ejection of condensate has been attempted by employing various types of float valve assemblies, but ejection by this type of valve assembly is found to be uncontrollable. The vibration of the vehicle constantly agitates the float valve which in turn causes undesirable actuation of the valve assembly and unnecessary ejections. It is readily observed that soon all the condensate is ejected, but further unnecessary ejections continue to bleed the reservoir of the compressed air therein. Also, various jump type valves have been employed and found to be undesirable due to their inability to perform satisfactorily at various actuation pressures. Under certain circumstances, the jump type valve can be balanced in the open position whereby the reservoir pressure is afforded direct access to an open exhaust port thereby bleeding said reservoir of the compressed air therein.

One of the principal objects of the present invention is to provide an automatic drain valve which ejects only a predetermined amount of compressed air along with the condensate. Another object of the present invention is to provide an automatic drain valve which is normally closed to reservoir pressure. Still another object of the present invention is to provide an automatic drain valve which is actuated without regard to pressure fluctuations in the reservoir. A further object of the present invention is to provide a valving arrangement in the automatic drain valve which never allows the reservoir pressure direct access to an open exhaust. These and other objects and advantages will become apparent hereinafter.

The present automatic drain valve comprises a valve housing having a bore with an inlet connected to a source of compressed air having condensate therein. A normally closed inlet valve in said bore controls a passage connecting said bore with an ejection chamber, said inlet valve being controllably linked with a normally open exhaust valve which is positioned between the ejection chamber and an exhaust chamber, the latter being provided with an exhaust port to atmosphere. A resilient means forms a movable wall between the exhaust chamber and an application chamber which is connected to a source of pressure. At a predetermined pressure in the application chamber, the resilient means closes the exhaust valve thereby closing or shutting off communication between the ejection chamber and the exhaust chamber and governing the actuation of the normally closed inlet valve since said inlet valve is controllably linked with the exhaust valve.

The invention also consists in the parts and in the arrangements and combinations of parts hereinafter described and claimed. In the accompanying drawing which forms part of this specification and wherein like numerals refer to like parts wherever they occur:

Fig. 1 is a vertical cross-sectional view of a drain valve embodying the present invention shown in a schematic view of a compressed air system.

Referring now to the drawing in detail, a compressed air system is illustrated comprising an air compressing means 1 having the pressure side thereof connected to an application valve 2 by a conduit 3 with an air reservoir 4 positioned therebetween. A conduit 5 connects the outlet side of the application valve 2 with power cylinders or brake operating cylinders 6 and 7. In addition to the above-described system, a conduit 8 is positioned between the reservoir 4 and the inlet of a drain valve 9 which embodies the present invention. To complete the system, a conduit 10 connects a port in the drain valve 9 with the pressure side of the compressor compressing means 1.

The drain valve 9 comprises an upper housing 11 which is sealably connected to the upper end of an intermediate housing 12 by suitable means, such as studs 13, having a first resilient member or flexible diaphragm 14 mounted therebetween. A lower housing 15 is sealably connected to the lower end of the intermediate housing 12 by said studs 13 with a second resilient member or flexible diaphragm 16 mounted therebetween.

A mounting flange 17 is provided on the upper end of the housing 11 which is provided with a bore 18, a passage 19, and an ejection chamber 20 axially aligned therein. The upper end of the bore 18 receives an end cap 21 with a gasket 22 sealably positioned therebetween. The lower end of the bore 18 is intersected by a horizontally arranged inlet 23 which receives the conduit 8. An inlet valve 24 is slidably mounted on a cylindrical recess 25 in the end cap 21. The valve 24 has a flat portion 26 thereon to prevent a dash pot effect in said recess 25 upon actuation of said valve, to be described later. The inlet valve 24 is normally biased into a sealable engagement with a co-operating seat 27 formed at the juncture of the bore 18 and the passage 19 by a spring 28 positioned between the end cap 21 and said valve 24. The inlet valve 24 is also provided with a push rod recess 29 to guidingly receive one end of a push rod 30, said recess 29 and the rod 30 being so arranged as to permit lost motion therebetween upon actuation of said valve, to be discussed later.

The rod 30 extends coaxially through the passage 19 into the lower end of the ejection chamber 20 where its other end is fixedly mounted in a seal screw 32 of a tubular exhaust valve assembly. The seal screw 32 is provided with a cross passage 33 intersecting a vertical passage 31. The mid-portion of the screw 32 is provided with a radially extending lip 34 for engagement with the first diaphragm or resilient member 14. The lower end of the seal screw 32 extends through the central portion of said member 14. A tubular exhaust stem 35 having a bore 36 to threadedly receive the lower end of said screw 32 is also provided with a radially extending lip 37 which co-operates with the lip 34 of the seal screw 32 to sealably engage the first resilient member 14 therebetween. The lip 37 of the exhaust stem 35 normally abuts against the upper portion of an inwardly extending flange 38 integrally formed within the intermediate housing 12. The exhaust stem 35 extends downwardly through a centrally located aperture 39 in said flange 38 into an exhaust chamber 40 which is provided in the housing 12 and which is axially aligned with the ejection chamber 20. An exhaust port 41 is also provided in the intermediate housing 12 connecting the exhaust chamber 40 with the ambient atmosphere.

The second resilient member or diaphragm 16 forms a movable wall between the exhaust chamber 40 and an axially aligned application chamber 42 provided in the lower housing 15. The central portion of the diaphragm 16 normally abuts against projections on lower end wall of said application chamber. The application chamber 42 is provided with a horizontally arranged port 43 in the lower housing 15 which receives the conduit 10.

The operation of the automatic drain valve 9 is controlled by the compression cycle of the compressing means 1. When the compressing means 1 is in the "on" cycle thereby increasing the pressure of the system to a predetermined maximum, the application chamber 42 in the drain valve 9 is in direct communication with the pressure in said compressing means by means of the conduit 10 and the port 43. Due to the pressure differential existing between the application chamber 42 and the exhaust chamber 40, which is vented to atmosphere, the second resilient member 16 moves upwardly to sealably engage the lower end of the exhaust stem 35 thereby interrupting communication between said exhaust chamber 40 and the ejection chamber 20. As the established pressure differential increases, the second resilient member 16 further sealably engages the stem 35 and carries said stem, the first resilient member 14, the seal screw 32, and the rod 30 upwardly therewith.

Due to the lost motion of the rod 30 before abutting against the end of the recess 29 in the inlet valve 24, the ejection chamber 20 is always sealed from atmospheric pressure by the sealable engagement between the exhaust stem 35 and the second resilient member 16 before the valve 24 is unseated. When the upward movement of the rod 30 unseats the valve 24, condensate which has accumulated in the bore 18, the inlet 23, and the conduit 8 is forced therefrom by the pressure of the system into the ejection chamber 20. Since the exhaust stem 35 is sealed, as aforementioned, only a predetermined amount of compressed air can enter the ejection chamber 20 along with the condensate.

When the pressure of the system reaches the predetermined maximum, the compressing means ceases compressing or reverts to the "off" cycle. Upon cycling, the application chamber 42 of the drain valve 9 is vented to atmospheric pressure by means of the inlet 43, the conduit 10, and the compressing means 1 thereby destroying the pressure differential between the exhaust chamber 40 and said application chamber. However, the pressure is maintained in the rest of the system. In this manner, the pressure of the compressed air acting on the first resilient member 14 in the ejection chamber 20 forces said member and parts associated therewith downwardly. The initial downward movement of the first resilient member 14 permits the spring 28 in the bore 18 to seat the inlet valve 24 against the seat 27 as the rod 30 moves away from the end of the recess 29 in said valve, and further downward movement thereof allows the lip 37 of the stem 35 to engage the flange 38. The pressure existing in the ejection chamber 20 and the bore 36 of the exhaust stem 35 forces the second resilient member 16 to move away from the lower end of said exhaust stem 35. The air pressure in the ejection chamber 20 expels the condensate through the cross-passages 33, the vertical passage 31 of the seal screw 32, and the bore 36 of the stem 35 into the exhaust chamber 40, and therefrom through the exhaust port 41 to the ambient atmosphere.

If the operator actuates the application valve 2 to actuate the power cylinders 6 and 7 to cause vehicle braking or if leaks exist in the system, the pressure of the system could possibly be diminished to a predetermined minimum. In this event, the compressing means 1 cycles again thereby initiating the actuation of the drain valve 9, as previously described.

It should be noted that during the "on" cycle, the bore 36 of the exhaust stem 35 is always closed before the inlet valve 24 is opened by the upward movement of the rod 30; and, during the "off" cycle, the inlet valve 24 is closed before the second resilient member 16 is disengaged from the co-operating exhaust stem 35. Consequently, it is readily apparent that the compressed air pressure in the reservoir is never allowed direct access to an open exhaust. It should also be noted that communication between the reservoir 4 and the ejection chamber 20 of the drain valve 9 is interrupted by the normally closed inlet valve 24. In this manner, there is no possibility of ever bleeding pressure from the system in excess of the predetermined amount needed to eject the condensate.

Pressure fluctuations in the reservoir 4, as may be caused by leaks in the system or minor braking applications for example, do not actuate the instant drain valve 9. The drain valve 9 is controllably actuated by the cycling of the compressing means 1. Therefore, unnecessary ejections caused by minor pressure fluctuations are eliminated.

While the port 43 of the drain valve 9 is shown connected to a conduit 10 which leads to the pressure side of the compressor 1, actuation of said valve 9 could also be initiated by other components of a braking system if desired. For example, the application valve 2 could be connected to the port 43 of the valve 9 thereby actuating the valve 9 when effecting vehicle braking. Obviously, the hereinbefore described drain valve admits of considerable modification without departing from the invention except as defined in the claims. Therefore, I do not wish to be limited to the precise arrangements shown and described.

What I claim is:

1. An automatic drain valve having an inlet and a plurality of chambers including an ejection chamber, an exhaust chamber with an exhaust port therein, and an application chamber, said application chamber adapted to be connected to a source of pressure, a passage between said inlet and said ejection chamber, an inlet valve between said inlet and said ejection chamber normally closing said passage, an exhaust valve between said ejection chamber and said exhaust chamber, said exhaust valve having a passage therein normally connecting said ejection chamber and said exhaust chamber, resilient means mounted between said application chamber and said exhaust chamber adapted to close said exhaust valve when the pressure in said application chamber exceeds a predetermined amount, said exhaust valve and inlet valve operatively connected by a rod so that said passage in said exhaust valve is closed by said resilient means before said inlet valve is opened.

2. An automatic drain valve having an inlet and a plurality of chambers including an ejection chamber, an exhaust chamber with an exhaust port therein, and an application chamber, said application chamber adapted to be connected to a source of pressure, a passage between said inlet and said ejection chamber, an inlet valve between said inlet and said ejection chamber normally closing said passage, an exhaust valve between said ejection chamber and said exhaust chamber, said exhaust valve having a passage therein normally connecting said ejection chamber and said exhaust chamber, a flexible diaphragm mounted between said application chamber and said exhaust chamber adapted to close the passage in said exhaust valve when the pressure in said application chamber exceeds a predetedmined amount, said exhaust valve and inlet valve operatively connected by a rod with lost motion therebetween thereby insuring that said passage in said exhaust valve is closed by said diaphragm before said inlet valve is opened.

3. An automatic drain valve having an inlet and a plurality of chambers including an aligned ejection chamber, exhaust chamber with an exhaust port therein, and application chamber, said application chamber adapted to be connected to a source of pressure, a passage between said inlet and said ejection chamber, an inlet valve between said inlet and said ejection chamber normally closing said passage, a tubular exhaust valve mounted on a flexible diaphragm between said ejection chamber and said exhaust chamber, said exhaust valve having a passage therein normally connecting said ejection chamber and said exhaust chamber, a second flexible diaphragm mounted between said application chamber and said exhaust chamber adapted to close the passage in said tubular exhaust valve when the pressure in the application chamber exceeds a predetermined amount, said exhaust valve and inlet valve operatively connected by a rod with lost motion therebetween thereby insuring that said passage in said exhaust valve is closed by said diaphragm before said inlet valve is opened.

4. An automatic drain valve having an inlet and a plurality of chambers including an aligned ejection chamber, exhaust chamber with an exhaust port therein, and application chamber, said application chamber adapted to be connected to the pressure side of a compressor, a passage between said inlet and said ejection chamber, an inlet valve positioned between said inlet and said ejection chamber normally closing said passage, said inlet valve having a recess therein, a tubular exhaust valve mounted on and extending through a flexible diaphragm between said ejection chamber and said exhaust chamber, said exhaust valve having a passage therein normally connecting said ejection chamber and said exhaust chamber, a second flexible diaphragm mounted between said application chamber and said exhaust chamber adapted to close the passage in said tubular exhaust valve when the pressure in the application chamber exceeds a predetermined amount, said exhaust valve and inlet valve secured together by a rod movable within the recess in said inlet valve thereby causing lost motion therebetween thereby insuring that said passage in said exhaust valve is closed by said diaphragm before said inlet valve is opened.

5. An automatic drain valve having an inlet and a plurality of chambers including an aligned ejection chamber, exhaust chamber with an exhaust port therein, and application chamber, said application chamber adapted to be connected to the pressure side of a compressor, a passage between said inlet and said ejection chamber, an inlet valve between said inlet and said ejection chamber normally closing said passage, said inlet valve having a recess therein, a tubular exhaust valve mounted on a flexible diaphragm between said ejection chamber and said exhaust chamber, said exhaust valve having a passage therein normally connecting said ejection chamber and said exhaust chamber, a second flexible diaphragm mounted between said application chamber and said exhaust chamber and adapted upon movement to close the passage in said tubular exhaust valve when the pressure in the application chamber exceeds a predetermined amount, a rod extending upwardly from said tubular exhaust valve into the recess in said inlet valve, whereby movement of said second diaphragm in response to a predetermined pressure first closes said exhaust valve and then opens said intake valve.

6. An automatic drain valve comprising a casing having an upper housing, an intermediate housing, and a lower housing, a flexible diaphragm mounted between said intermediate and said lower housings, said lower housing containing an application chamber adapted to be placed in communication with a source of pressure, said intermediate housing containing an exhaust chamber and an exhaust port, said intermediate housing having an axial opening therein, said upper housing having an inlet adapted to be connected to a source of compressed air and having an ejection chamber therein, said upper housing having an axial opening therein, a normally closed inlet valve positioned between said inlet and said ejection chamber, said inlet valve normally biased against the wall of said upper housing circumscribing said axial opening thereby closing said axial opening, a rod extending from said inlet valve through said axial opening and into said ejection chamber, said rod having a tubular exhaust valve thereon with an exhaust passage therethrough, said exhaust passage in said exhaust valve adapted to be closed by movement of the flexible diaphragm mounted between said intermediate and said lower housing in response to pressure in said application chamber, continued movement of said exhaust valve and rod causing said inlet valve to open.

7. An automatic drain valve comprising a casing having an upper housing, an intermediate housing, and a lower housing, flexible diaphragms mounted between said housings, said lower housing containing an application chamber adapted to be placed in communication with the pressure side of a compressor, said intermediate housing containing an exhaust chamber and an exhaust port open at all times to atmosphere, said intermediate housing having an axial opening therein, said upper housing having an inlet adapted to be connected to a reservoir containing compressed air and having an ejection chamber therein, said upper housing having an axial opening therein, an inlet valve positioned between said inlet and said ejection chamber normally closing said axial opening, said inlet valve normally biased against the wall of said upper housing circumscribing said axial opening, said inlet valve having a recess therein, a tubular exhaust valve having a passage therein mounted on and extending through the diaphragm mounted between said upper and said intermediate housings, a rod extending from said tubular exhaust valve partially into the recess in said inlet valve, the passage in said tubular exhaust valve adapted to be closed by movement of the diaphragm mounted between said intermediate and said lower housing in response to pressure in said application chamber, continued movement of said exhaust valve causing said rod to move completely within said recess in said intake valve to open said inlet valve.

8. An automatic drain valve for draining moisture from compressor reservoirs and the like comprising a casing having an upper housing, an intermediate housing, and a lower housing, a flexible diaphragm mounted between said upper housing and said intermediate housing, and a flexible diaphragm mounted between said intermediate housing and said lower housing, said lower housing containing an application chamber adapted to be placed in communication with the pressure side of a compressor, said intermediate housing containing an exhaust chamber and an exhaust port open at all times to atmosphere, said intermediate housing having an axial opening therein, said upper housing having an inlet adapted to be connected to a reservoir containing compressed air and having an ejection chamber therein, said upper housing having an axial opening therein, a normally closed inlet valve positioned between said inlet and said ejection chamber for connecting and disconnecting said ejection chamber from said inlet, said inlet valve having a recess therein opening toward said ejection chamber, a spring positioned between said inlet valve and said upper casing for normally biasing said inlet valve to its closed position, a tubular exhaust valve mounted on and extending through the diaphragm mounted between said upper and said intermediate housings, said rod extending from said exhaust valve through said ejection chamber and partially into the recess in said inlet valve, the passage in said tubular exhaust valve adapted to be closed by movement of said diaphragm mounted between said intermediate and said lower housing in response to pressure in said application chamber, continued movement of said diaphragm causing said rod to move completely within said recess in said intake valve and subsequently open said intake valve for allowing communication between said inlet and said ejection chamber.

References Cited in the file of this patent
UNITED STATES PATENTS

| | | |
|---|---|---|
| 2,418,440 | White et al. | Apr. 1, 1947 |
| 2,739,605 | Smith | Mar. 27, 1956 |